INVENTOR
PIERRE BOVE
BY Young, Emery + Thompson
ATTYS.

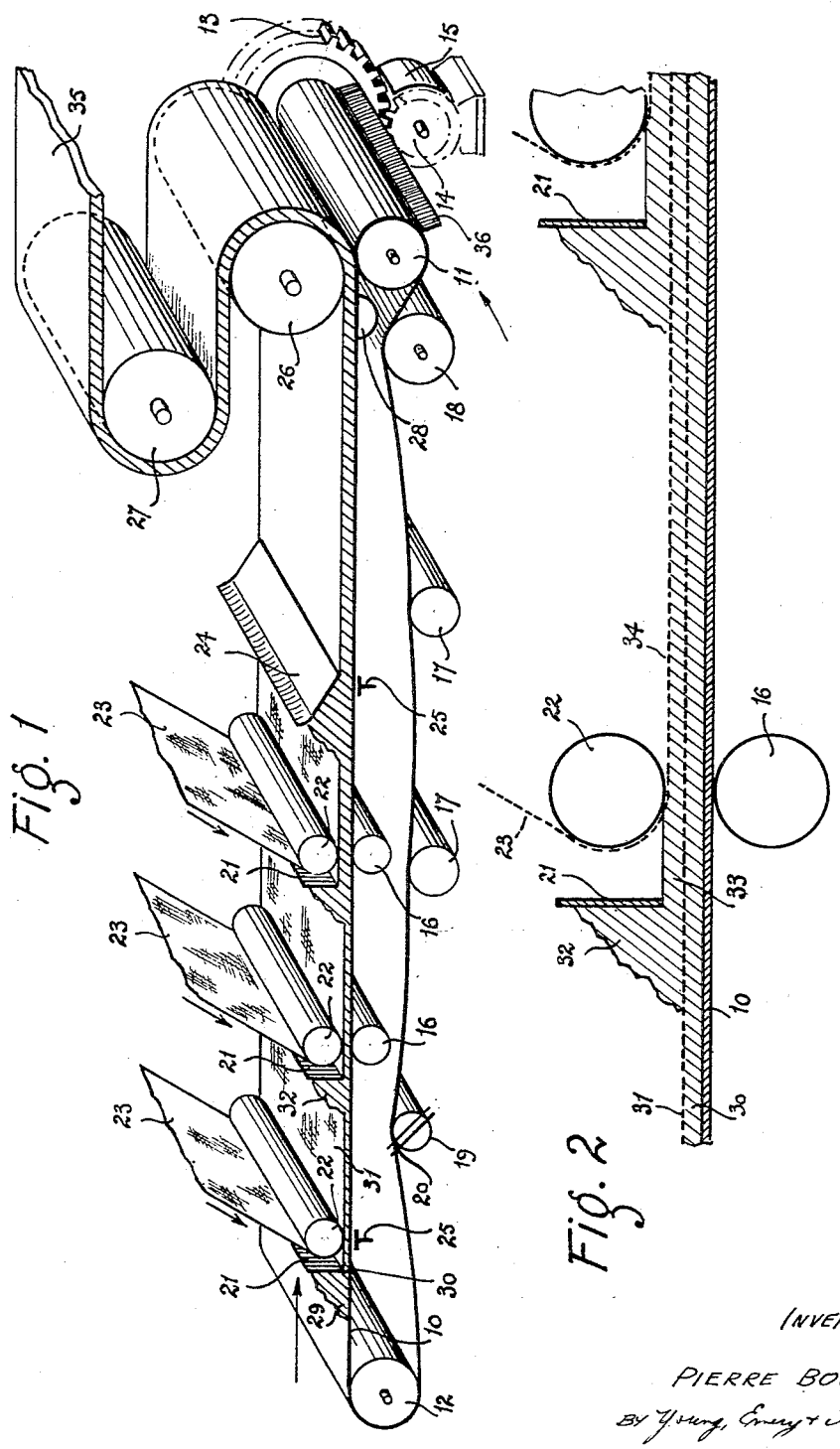

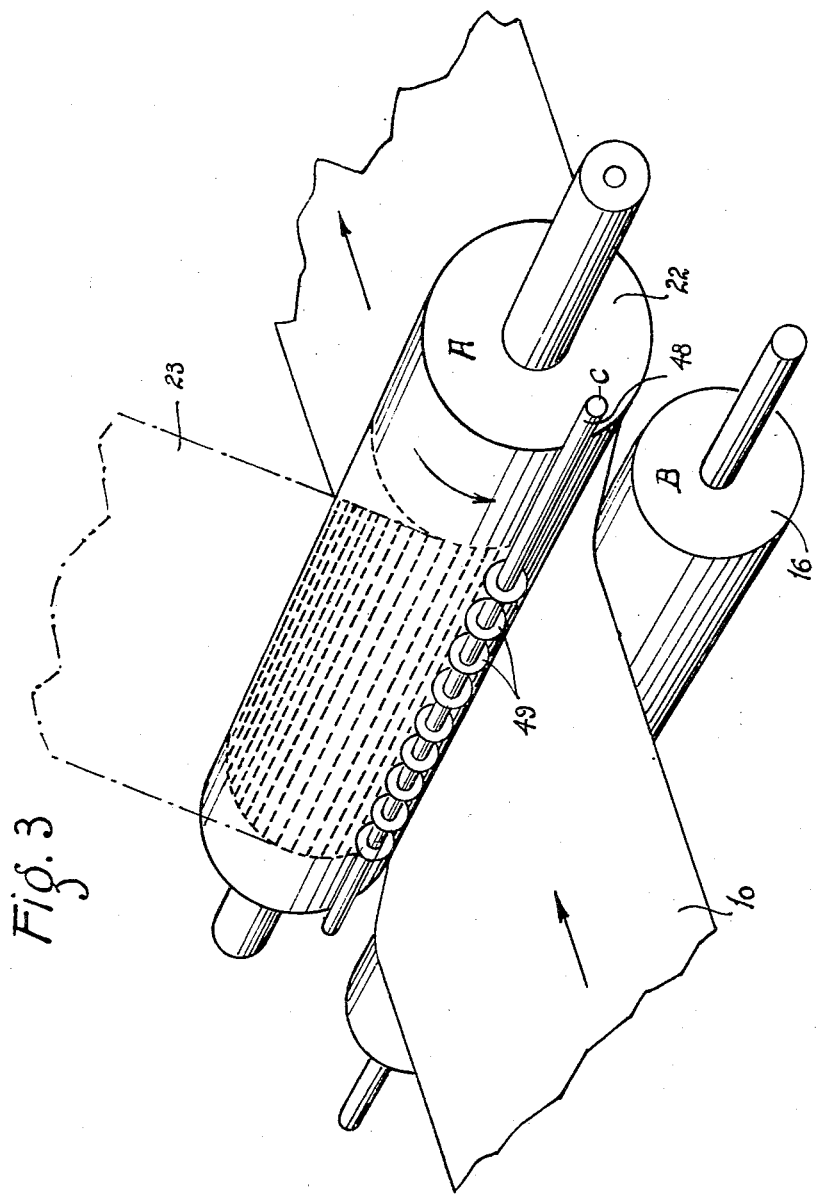

United States Patent Office 2,836,221
Patented May 27, 1958

2,836,221

APPARATUS FOR MANUFACTURING WATERPROOF COVERINGS

Pierre Bove, Blanc-Mesnil, France, assignor of one-half to Société Francaise de Materiaux et Produits Hydrofuges "La Callendrite," Paris (Seine), France, a corporation of France Application September 4, 1956, Serial No. 607,811

Claims priority, application France September 24, 1955

3 Claims. (Cl. 154—1)

The present invention has for its object a method of manufacture of water-tight coverings in sheets, such as those used for the coverings of buildings, linings of vats, floor or wall coverings, together with a device for carrying this method into effect.

It is known that coverings of this kind generally comprise a support or reinforcement of canvas, felt, metallic foil, which is impregnated and coated whilst hot with a waterproof base of tar, bitumen or like substances. In their manufacture, the reinforcement is generally used as a support for the waterproof base, which makes it necessary that the reinforcement should have sufficient strength during manufacture, which is carried out in the hot state.

A method of manufacture of this kind limits the choice of supports or reinforcements. It excludes the use of supports of low strength which soften when hot or become elastic. It lends itself badly to the manufacture of coverings with multiple reinforcements, and especially of those which formed the subject of the patent application filed in the United States on February 17, 1955 under the No. 488,935.

The method in accordance with the present invention has for its object to remedy these drawbacks and at the same time offering various other advantages.

This method is characterized in that on an endless belt which is in continuous movement, the waterproof base is poured out at a number of points in succession, and in that, between these pouring points, one or a number of support sheets are applied on the waterproof base by means of rollers which ensure at the same time the guiding of the support sheets and the spreading out and regulation of the thickness of the layer of waterproof base.

In accordance with this method, the constituent parts of the covering, waterproof base and supports, are at all times carried by the belt, and their own strength when hot is no longer a factor in the process of manufacture. In this way, it is easy to make coverings with multiple reinforcements, which even have no strength at all in the hot state. During the course of manufacture, it is also possible to apply all treatments which may be desired, such as crimping, folding or the like.

As the waterproof base, there are included the usual substances which serve to constitute coverings of the kind considered: tar or bitumen, or a mixture of these substances. But there are also included these substances with the addition of all products which are likely to improve their qualities, such as plastic material, rubber, etc.

When the support or supports are constituted by sheets of plastic material, the raw plastic material may be applied on the waterproof base by the rollers so as to be spread out into sheets which become polymerized on contact with the hot adjacent layers of the waterproof base.

The accompanying drawings show one manner of carrying the method according to the invention into effect, and the apparatus for this application.

Fig. 1 is a general view in perspective of the installation.

Fig. 2 is a view in detail in cross-section of a part of Fig. 1.

Fig. 3 gives a perspective view of an alternative form of an element.

Figure 4:
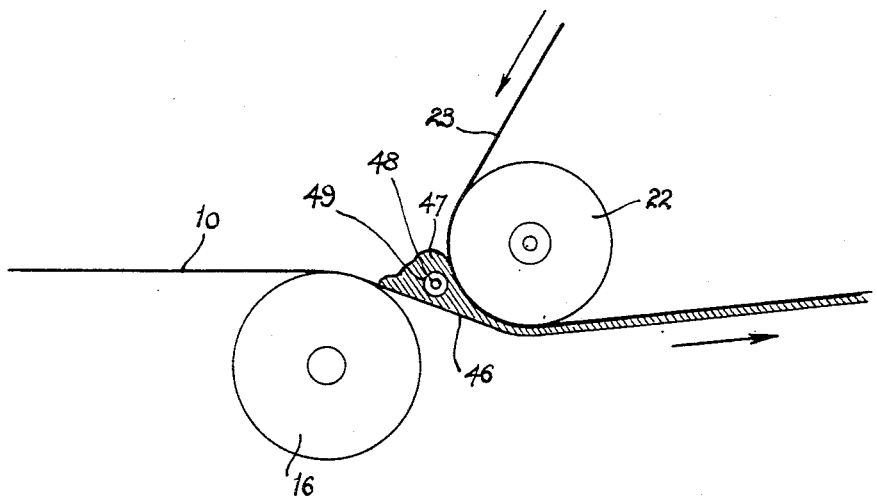

Fig. 4 is a view in cross-section of the device shown in Fig. 3.

Figure 5:

Fig. 5 shows a cross-section of the junction of the two coverings obtained in accordance with the present method.

Figure 6:
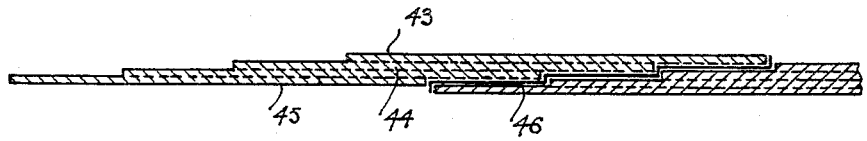

Fig. 6 shows in cross-section another junction of two elements of the covering.

In the example shown, the apparatus is provided for the manufacture of a covering having three reinforcements. It is to be understood, however, that the method may be applied to the production of coverings with a single support or multiple supports of any desired number.

In the drawings, the apparatus used consists of an endless belt 10 comprising a belt, a film, a cloth, woven wire or a strip of thin sheet of any suitable metal. This belt is mounted on the driving drum 11 and the carrier drum 12. The driving drum is driven by any appropriate means, such as the gears 13, 14, and the reduction-gear drive 15.

Along the path of the upper side of the belt 10 are arranged roller-supports 16 which are suitably spaced apart. The lower side of the belt rests on roller-supports such as 17, 18. In the case of the arrangement shown, the roller 18 ensures the correct engagement of the belt on the roller 11; this roller 18 may be a driving roller if required. At 19, there is provided a guiding and regulating roller which can oscillate in slides 20.

Above the belt 10, and suitably spaced therefrom, there may be arranged scrapers 21 to retain the waterproofing base. Following each scraper 21, there is arranged a movable roller 22 the height of which is variable, and over which passes the reinforcement 23 before it is applied on the waterproof base carried on the belt 10. When the upper layer of waterproof base is formed, a scraper 24 serves as a guide for the final period of manufacture of the covering. The scrapers 21 and 24 may be provided with any suitable devices to facilitate the spreading of the waterproof base, for example by heating or coating.

In Figs. 1 and 2, the rollers 22 and the roller-supports 16 are arranged directly above each other. They may constitute a calender, and even a crimping calender, if the crimping of the reinforcement is not effected before or after the roller 22.

Instead of the roller supports 16, fixed support members such as 25 may be provided under the belt. A fixed support of this kind is also provided under the scraper 24. At the extremity of the belt close to the drum 11 is mounted a drum 26 which receives the covering formed on the belt 10 and passes it over a further drum 27. In the vicinity of the drum 11, there is also provided under the belt 10 a heating device 28 which ensures the detachment of the covering before it is rolled over the drum 26.

In order to manufacture the covering, the belt 22 is set in motion in the direction of the arrow and a mass of bituminous mixture or similar material is placed at 29, behind the first scraper 21. A first layer 30 of this material is carried along by the belt and passes under the scraper 21, the spreading being limited along the sides of any suitable means, such as adjustable cheeks (not shown). On to this layer is brought a first reinforcement 31 delivered by the first roller 22, the speed of which controls the tension applied to this reinforcement. At the same time, the roller 22 effects the spreading of the waterproof base and regulates its thickness. A surface treatment or coating may be provided so as to give suitable qualities of adhesion between the reinforcement 31 and the layer 30. The layer thus covered by the reinforcement 31 meets a fresh mass 32 of bituminous material as it passes by the second scraper 21, and this mass 32, carried by the belt past the scraper 21, forms a second layer 33. As this second layer passes under the roller 22, it has applied to it a second reinforcement 34, and so on.

There is thus obtained a covering with multiple reinforcements which receives its last layer of bituminous material as it passes under the scraper 24.

The bituminous masses 29, 32, placed behind the scrapers are spread out whilst hot on the belt 10. They set by spontaneous or forced cooling and adhere to the reinforcements.

The machine may be provided with various arrangements, such as internal or external heating or cooling of the rollers 22. The exterior of these rollers may be coated or humidified in order to facilitate the cooling and carrying away of the reinforcement, or to prevent the products adhering to these rollers. In the same way these rollers may comprise any means of crimping, surfacing or finishing. The extremities of the rollers may be heated and so may also a scraper associated with the whole length or on the extremities only, for example, in order to remove the excess of bituminous mass which may have been able to overflow on to the sides.

Under the belt 10, a heating or a cooling device may be provided in order to regulate the spreading and the adhesion of the layer 30.

The covering produced in this way may be given any suitable treatment during its passage between the scraper 24 and the drum 26. In particular, it may be subjected to a surface treatment and to a cooling action by any suitable means, projection of water, blast of air or immersion.

In the same way, a number of operations may be effected between the rollers 22, such as heating for giving surface finish or evacuation of bubbles from inside the layers 30, coating of this layer or of the reinforcements 31 and 34, crimping of the reinforcements and cooling.

In order to assist the detachment from the endless belt, it is possible to utilise a blade, whether heated or not, inserted between the covering and the belt 10, or alternatively a heating is effected at 28 under the belt 10, which softens the under-face of the covering in contact with the belt and enables the covering to be detached and to be rolled over the drum 26. In this case, the covering acquires a veined appearance which may be retained in certain cases when it appears desirable, or may be ultimately removed by a surface treatment.

An accessory scraper 36 or any other cleaning member is provided to keep the carrier belt clean. This cleaning device may be accompanied by a heating action in order to facilitate the removal of the products which remain adhered to the belt, or again it may be humidified or coated to facilitate its action.

After it has left the belt 10, the covering is wound over the drums 26 and 27 and is taken off in the finished state at 35. The passage over the drums 26 and 27 may be utilised to give a surface treatment to the second face of the covering.

In order to prevent complete or partial adhesion of the covering to the belt during the course of manufacture, the belt may be coated with any suitable product, for example with products having a base of silicones.

The belt 10 may be arranged so that its upper side is either horizontal or inclined. By means of suitable return drums, the working face of the belt 10 may be given any inclined position, even vertical if necessary, and the belt may even be reversed, depending on the cycle of operations to be followed.

In an alternative form of construction shown in Figs. 3 and 4, each of the rollers 22 is displaced with respect to the support-roller 16 in the direction of movement of the belt. It is also displaced in height, which compels the belt 10 to follow the form of an S between two consecutive units.

The waterproof base 47 is poured out in the area 46, between the two rollers 16 and 22, the base being then carried between the belt 10 and the roller 22, which latter applies the reinforcement 23 to the layer thus formed. In order to facilitate the carrying away of the mass 47, a spindle 48 carrying a number of discs 49 is disposed in this mass. The spindle 48 is rotatably driven in synchronism with the roller 22. The discs 49 carry away the mass 47 which is applied on the film 23, with the drive of which they assist. This prevents the drawing-out and deformation of the reinforcement 23 which is rendered less resistant at this moment because of its momentary increase in temperature.

The spindle 48 may be adjusted in position parallel to itself as a function of the stresses to which it is subjected. This setting in position may be effected automatically.

In order to form the covering, instead of using previously prepared sheets 23, it is possible to employ a raw plastic material in powder or in any other form, this being spread over the layer of waterproof base in a continuous sheet, its polymerization being effected by contact with the layers 30, 33 of the said waterproof base.

The covering in course of manufacture may have a width different from that of the carrier belt. It may be wider, especially when for example the reinforcements are allowed to pass beyond its edge in order to permit of connecting the reinforcement members of the different covering sheets together when the coverings are being placed in position for use. It may be narrower, the successive layers being of different widths or laterally displaced with respect to each other.

In this way, as shown in Fig. 5, the reinforcements may be allowed to extend freely at 41 and 42 without being coated with the waterproof base, over the edges of the covering. When the covering is being placed in position, the free and flexible extremities 41 and 42 of two corresponding sheets may be connected or coupled together, or they may be inserted between each other, an addition of waterproof base effecting the junction of the adjacent edges of two contiguous sheets. In this way, a joint without extra thickness can be easily made.

In accordance with an alternative method (see Fig. 6), the covering is made by displacing the successive layers in the transverse sense, such as 43, 44 and 45. There is thus obtained a sheet, the edge of which when being fixed in position, fits easily in the edge of the adjoining sheet, the joint being made without any additional thickness by a simple coating of adhesive at 46.

The moving belt 10 may be provided, in the sense of its width, with reinforcements by variations of thickness, or by added ribs or strips, with a view to the guiding spreading out and variation in thickness of the fabricated covering, etc. Variations in thickness of the covering produced may also be obtained by corresponding profiling either of the upper members or of the support members of the belt. In particular, the covering may be provided with thinned-down edges to permit of the overlapping of adjacent sheets without producing additional thickness.

What I claim is:

1. An installation for the manufacture of waterproof coverings formed by successive layers of a waterproof base, and sheets of synthetic thermoplastic resin alternating with the said layers of waterproof base, comprising an endless metallic strip, means for driving the said strip in continuous movement, a plurality of winding rollers spaced apart in the direction of forward movement of the endless band, each roller receiving a sheet of synthetic resin, and a plurality of support rollers arranged under the endless band, a support roller being located opposite each of the said winding rollers, each support roller being displaced towards the rear with respect to the winding roller in the direction of forward movement of the endless band, and also in height, the combination of the two said rollers producing a local sloping portion of the endless band, the waterproof base being added in the said sloping portion.

2. An installation for the manufacture of waterproof coverings formed by successive layers of a waterproof base, and of sheets of thermoplastic synthetic resin alternating with the said layers of waterproof base, comprising an endless metallic band, means for driving the said band in continuous movement, a plurality of winding rollers spaced apart in the direction of forward movement of the said endless band, each roller receiving a sheet of synthetic resin, a plurality of support rollers disposed under the endless band, a support roller being located opposite each of the said winding rollers, each support roller being displaced towards the rear of the winding roller in the direction of forward movement of the endless band, and in height, the combination of the two said rollers producing a local sloping portion of the endless band, the supply of waterproof base being added in the said sloping portion, and a shaft carrying discs rotating in synchronism with the rollers being arranged in the said waterproof base.

3. An installation for the manufacture of waterproof coverings formed by successive layers of a waterproof base, and of sheets of thermoplastic synthetic resin alternating with the said layers of waterproof base, comprising an endless metallic band, means for driving the said band in continuous movement, a plurality of winding rollers spaced apart in the direction of forward movement of the said endless band, each roller receiving a sheet of synthetic resin, a plurality of support rollers arranged under the said endless band, a support roller being located opposite each of the winding rollers, each support roller being displaced towards the rear of the winding roller, in the direction of forward movement of the endless band, and in height, the combination of the two said rollers producing a local sloping portion of the endless band, the supply of waterproof base being effected in the said sloping portion, and a shaft carrying discs rotating in synchronism with the rollers being arranged in the said waterproof base, the winding rollers being provided with heating means and having an engraved external surface.

References Cited in the file of this patent

UNITED STATES PATENTS

| | | |
|---|---|---|
| 48,311 | Robinson | June 20, 1865 |
| 1,137,279 | Peterson | Apr. 27, 1915 |
| 2,091,124 | Stewart | Aug. 24, 1937 |
| 2,722,495 | Hedges | Nov. 1, 1955 |

FOREIGN PATENTS

| | | |
|---|---|---|
| 853,745 | Germany | Oct. 27, 1952 |
| 379,145 | Great Britain | Aug. 25, 1932 |